H. J. MURRAY

1,559,975

AUTOMATIC SPEED CHANGING POWER TRANSMISSION DEVICE

Filed June 21, 1920    4 Sheets-Sheet 4

INVENTOR
Howard J. Murray.

Patented Nov. 3, 1925.

1,559,975

UNITED STATES PATENT OFFICE.

HOWARD J. MURRAY, OF BROOKLYN, NEW YORK.

AUTOMATIC SPEED-CHANGING POWER-TRANSMISSION DEVICE

Application filed June 21, 1920. Serial No. 390,540.

*To all whom it may concern:*

Be it known that I, HOWARD J. MURRAY, a citizen of the United States, and resident of Brooklyn, in the county of Kings and State of New York, have invented certain new and useful Automatic Speed-Changing Power-Transmission Devices, of which the following is a specification.

My invention relates in general to a variable speed power transmission and automatic control mechanism, and specifically relates to a device for manually or automatically maintaining desired speed and torque values from a constantly driven variable or constant speed power actuating member.

One of the objects of my invention is to provide a simple form of flexible power transmitting device which will transmit power:

(a) At constant speed to the driven or actuated member, as said driven member is subjected to conditions of varying torque.

(b) At constant torque to the driven member when said driven member is subjected to conditions of varying speed.

(c) Automatically to a driven member at a desired variable speed-torque ratio, as the speed of the driving member is varied.

(d) Automatically to a driven member at a desired variable speed-torque ratio, as the torque of the driving member is varied.

(e) To a driven member from a driving member during which interval the speed-torque ratio may be varied manually, or automatically; or a combination of both said control means.

(f) At constant speed to the driven member when connected to a variable speed driving member.

(g) At constant torque to the driven member when connected to a variable torque driving member.

(h) While the driven member is caused to automatically function with the driving member so that constant speed and variable torque are imparted to the said driven member.

(i) And at the same time control the supply of energy means to the actuating member so that variable speed at constant torque will be transmitted to the driven member.

(j) Selectively by mechanical, electrical, or manual means to secure a plurality of speed and torque values from a driving power member.

(k) Automatically by mechanical, electric, or manual control means to secure different speeds and torque values on both said driving and driven members.

In one physical embodiment of my invention, I broadly attain the flexible transmission of power from a driving member to a driven member at constant speed or at constant torque, or at any desired speed-torque ratio by providing a device having two paths for the transmission of power, consisting of a main path and an auxiliary or control path.

The said auxiliary path consists of means designed to cause and maintain desired or required speed and torque ratios between the main driving and driven power shafts.

The invention also contemplates the use of a control, either manual, electrical, or mechanical, or a combination of all three methods; so that a given or desired speed on the driven member will be automatically changed to another desired or constant speed.

The said control may also be applied so that a portion of the total transmitted power will be used by the auxiliary means thereby to maintain a constant torque on the driven member, or to automatically effect a change to another desired or required torque.

The invention allows numerous physical embodiments and two different types are herein illustrated for the purpose of showing the wide application of the invention, but it is understood that the showings in the drawings are largely diagrammatic, merely being sufficient in detail to show applications of the invention.

While the invention is capable of use in any location where it is desired to receive power from a driven member, the invention is particularly applicable to an automatically controlled power transmission system designed for use in connection with automobile constructions, and it is in connection with this particular use that the invention will be described in detail.

Various other objects and advantages of the invention will be in part obvious from an inspection of the accompanying drawings and in part will be more fully set forth in the following particular description, and the invention also consists in certain new and novel features of construction and combination of parts hereinafter set forth and claimed.

In the drawings:

Figure No. 1 is a physical embodiment of my invention in horizontal section, taken axially of the main shaft and with co-acting parts shown in dash outline.

Figure No. 2 is a transverse sectional view taken approximately upon the line 2—3 of Figure No. 1, looking in the direction indicated by the arrow.

Figure No. 3 is a view similar to Figure No. 1 of another physical embodiment of my invention.

Figure No. 4 is a transverse sectional view taken on the line 4—4 of Figure No. 3.

Figure No. 5 is an enlarged view of the control means in horizontal section, taken axially of the shafts.

Figure No. 6 is a transverse sectional view taken approximately upon the line 6—6 of Figure No. 5.

Figure No. 7 is a diagrammatic view showing a direct current control circuit, applied to Figures Nos. 1 and 3.

In the following description and in the claims, parts will be identified by specific names for convenience of expression, but they are intended to be as generic in their application to similar parts as the art will permit.

Figure 1:
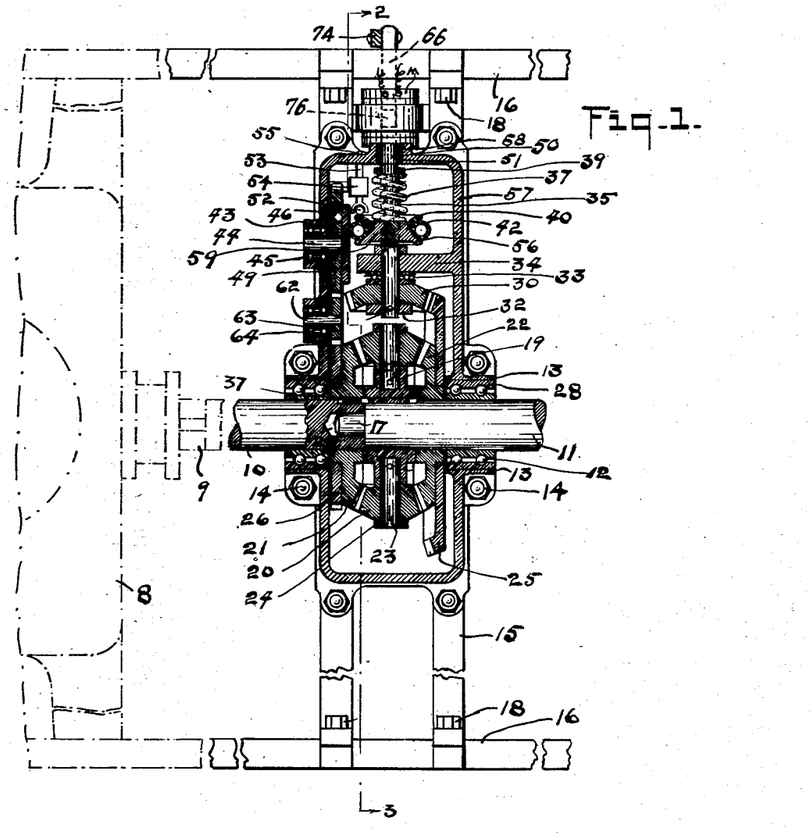
Figure 2:
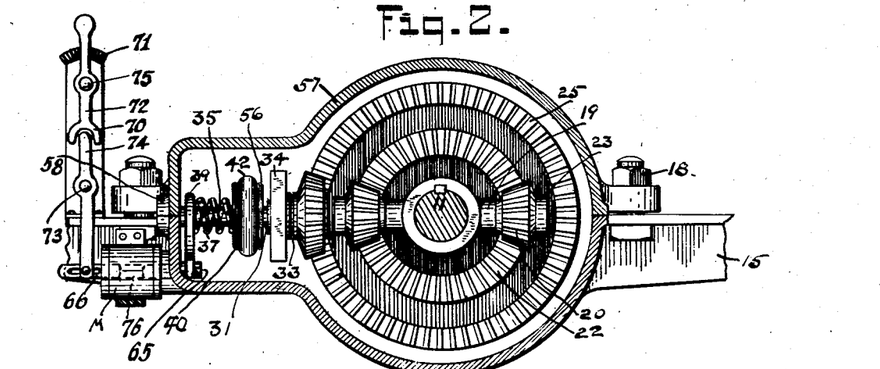

Referring to the embodiment of the invention as shown in Figure No. 1, there is shown a power transmitting device, including a pair of shafts 10 and 11 in axial alignment and with their adjacent ends interfitting to provide a mutual bearing 17.

Figure 3:
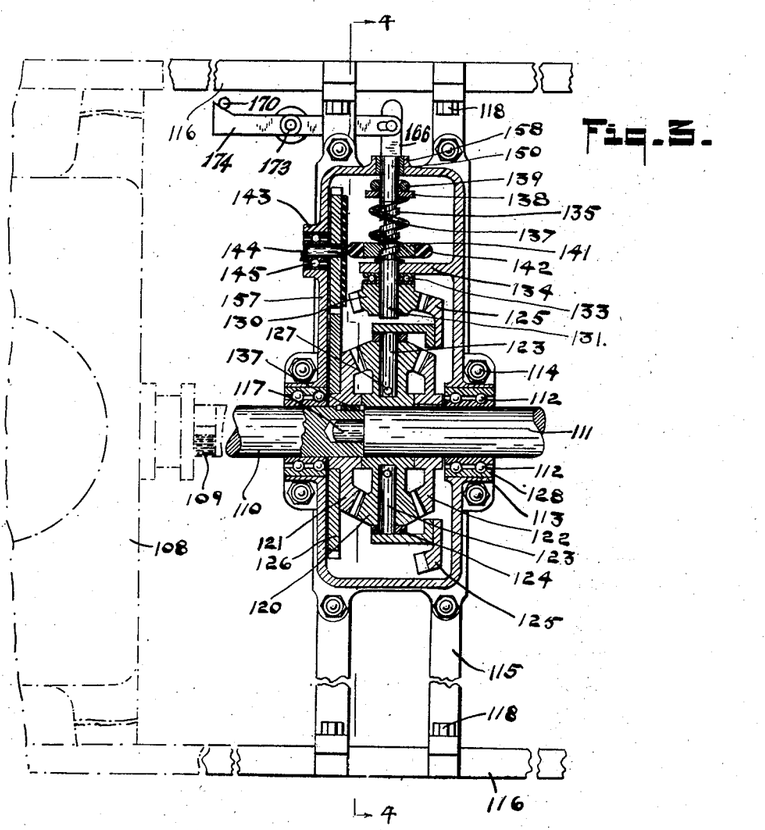

The shafts are mounted for independent rotary movement respectively in bearings hereinafter more particularly described and while either one of these shafts may be considered as the driven or as the driving member of the transmission, for the purpose of this description it will be considered that the shaft 10 is the driving member and is operatively connected to be driven from a source of mechanical power, such as an internal combustion engine 8 or other suitable prime mover, shown in dotted outline in Figures Nos. 1 and 3 and connected to the shaft 10 at will by the clutch 9.

Accordingly shaft 11 is regarded as the driven member and is operatively connected to whatever mechanism is designed to be driven from the prime mover, although it may obviously become the driving member.

Connecting the contiguous ends of the shafts is a differential bevelled gear train set formed of at least three gears meshing in order. The first gear 21 may be regarded as a driving gear, as it is fixed by means of the key 37 to the shaft 10 so as to rotate about the axis thereof. The other two gears of the train may be regarded as driven gears with the end gear 22 loosely mounted for rotary movement upon the shaft 11 and with the teeth thereof facing the teeth of gear 20.

As the gear 22 at this end of the train does not do direct mechanical work, it will be identified as an idler gear, or due to a function hereinafter described, this gear will be considered as a retarding gear. Both of the gears 21 and 22 are continuously in mesh with the intermediate driving gear 20 of the train. This gear 20 is mounted free to rotate about the axis of a transverse shaft 23 extending at right angles to the aligned axes of the shafts 10 and 11.

The shaft 23 is rigidly connected to and extends at right angles to the driven shaft 11 and is free to revolve with this driven shaft.

Instead of a single intermediate gear connection between the gears 21 and 22 preferably two or more such gears are used, as shown, in order to minimize distortional strains on the shaft, but it is obvious that any number of intermediate gears may be positioned between the facing gears in order to drive one from the other, provided their shafts are securely fixed to the driven shaft 11. A filler block 19 is pinned to the end of the shaft 11 and to the shafts 23 to provide bearings for the gears 20 and to maintain the gears squarely in meshing position.

Securely fixed to driving gear 21 so as to rotate with and about the axis thereof is a spur gear 26 arranged to mesh with a second spur gear 63, rotating on the bearing 64, in turn meshing with spur gear 46, revolving on fixed shaft 44. The axis of the shaft 44 is parallel to the axes of the shafts 10 and 11 and in the same horizontal plane and carries the thrust bearing 45. The shaft 44 is positioned and held by the hub 43, constituting an extended portion of the container casing 57. The frictional driving surface 49 is attached to and rotates with the gear 46. The frictional surface 48 is loosely fixed to the enlarged portion 47 of the stationary shaft 44. Hence, the frictional surface 49 rotates and the frictional portion 48 does not. The spur gear 63 is arranged and mounted to mesh and drive or be driven by gear 46 and gear 26 firmly attached to driving gear 21.

Securely fixed to the retarding and loosely mounted gear 22 so as to rotate with and about the axis thereof is a spur gear 25 arranged to mesh with a second bevel gear 30, rotating on the shaft 31 and against the thrust bearing 33. The axis of the shaft 31 (see Fig. 5) is at right angles to the axes of the shafts 10 and 11 and is preferably in the same horizontal plane.

Figure 5:
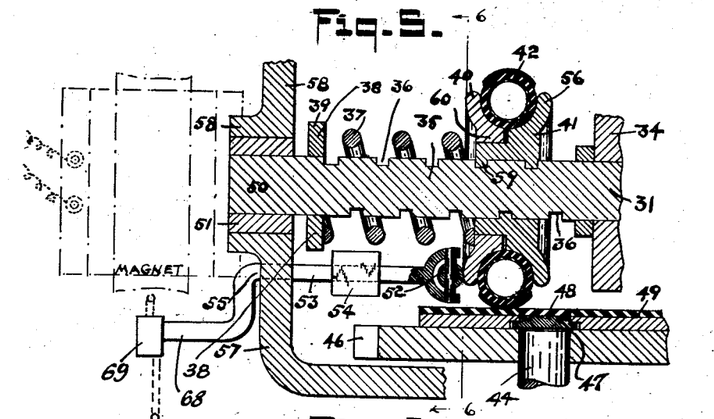

The shaft 31 has a spirally slotted portion 35 and ends in a shouldered portion 50 designed to rotate in the bearing 51 positioned in the wall 58 of the container 57.

The shaft 31 is also held in proper alignment by passing through an extended portion of the casing 34.

Slidably mounted for rotary motion on the spirally slotted portion 35 is a driven control wheel 41, having fingers 59 suitable for engaging and filling the slot 36.

The wheel 41 consists of two parts, the member 60 being demountable and backing up against 41 and having a circular curved flange 40. The curved flange 40, together with a similar curved flange 56 on the wheel body 41, presenting a circular housing for circular rotating and driving member 42. The member 42 has a cross-section as shown in Figure No. 5 and is preferably of suitable material to engage the friction surfaces 48 and 49 and thereby drive the control wheel 41. The entire area formed by the flanges 40 and 56 is filled by the driving member fitting face to face.

A compression spring 37 is spirally wound on the portion 35 having its spiral travel opposite to the spiral of the slot 36. A stop collar 38 loosely mounted on the shaft 31 provides a stop to the spring 37, the other end of the said spring pressing against the shoulder of the wheel 41.

A control wheel 52 rotates on the shaft portion of control rod 53, which is guided by passing through the post 54 and the extension section 58 of the container 57.

An extension of the rod 53 passes to a control lever 68 arranged to control the supply of energy passing through 69 to the motor 8 and thereby the power generated by same.

Figures 6, 7:
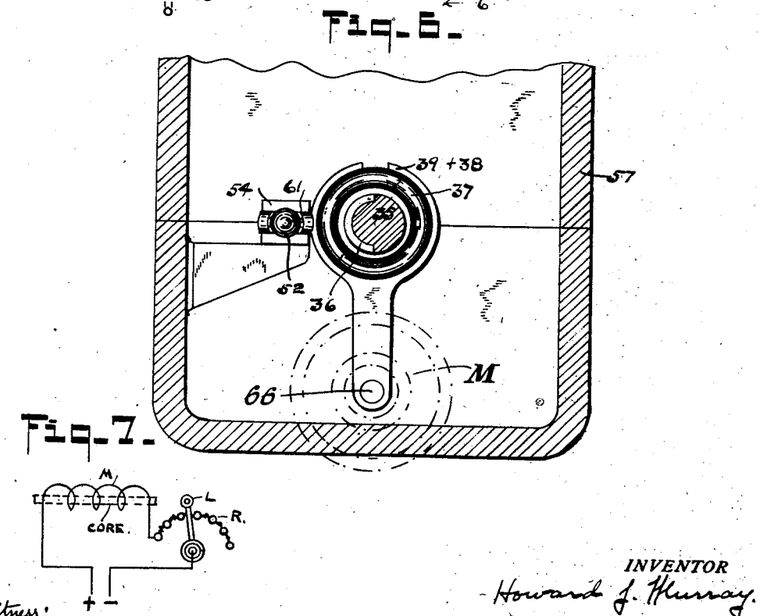

The forked fingers 39 are connected to an electric means M by the actuating rod 66 securely fastened to 39 by a suitable nut 65. When the electric means consists of a magnet the rod 66 includes a suitable armature 76 in its length. The strength of magnet is varied by including in its circuit a resistance R arranged to be varied by the lever L as shown in Fig. 7. Suitably attached to the rod 66 is a bar 74 pivotedly mounted at 73 thereby to impart a reciprocating motion to 66 when moved. One end of the said bar 74 is designed to operatively fit into the jaws 70 of a control lever 72 pivotedly mounted at 75 and selectively locked as desired at steps formed on the element 71, or permitted to freely swing about the pivot 75 when not locked.

In operation, it will be understood in connection with the device shown in Figure No. 1, first, that closing the clutch 9 (assuming the engine 8 to be rotating) imparts speed and torque to the driving shaft 10 and the driving gear 21. Under these conditions the driven shaft 11 is held stationary due to the inertia of the driven member to which it is connected and due to the differential gear connection disclosed, the holding or idler gear 22 will revolve or tend to revolve at the same speed as the driving gear 21, but in the opposite direction. In other words, if the driving gear 21 is revolving clock-wise, the idler gear 22 will revolve or tend to revolve counter-clockwise. Motion will be conveyed from the driving shaft 10, through the driving gear 21, intermediate gear 20, to the holding or idler gear 22, which is loosely mounted on the driven shaft 11. The spur gear 26 rigidly attached to the driving gear 21 is also rotated at the speed of the driving shaft 10, and, in turn, rotates the spur gear 63 rotating on stationary bearing 62 in proportion to its gear ratio which, in turn, rotates gear 46 turning on shaft 44. Hence, the friction disc 49 rigidly attached to gear 46 is given speed equal to gear 46, and the circular friction disc 48 loosely mounted within disc 49 and bearing against shaft 44 cannot receive power from either shaft 44 or disc 46.

The bevel gear 25 rigidly attached to the idler gear 22 will rotate or tend to rotate counter clock-wise, and this action will be transmitted to the co-acting bevel gear 30 meshing therewith and rotatable against the thrust bearings 33. The shaft 31 keyed to the bevel gear is designed to rotate clockwise with it and also rotate the spiral groove 36 cut in its portion 35. It is evident that rotation of the idler gear 22 will accordingly cause rotation of the spiral groove 36.

As the friction disc 49 is operatively connected with the friction pulley 41 by means of the friction band 42 it is also evident that the pulley 41 is also rotated by driving shaft 10 through driving gear 21, spur gear 26, spur gear 63, spur gear 46, friction disc 49 and friction band 42. However, the riding fingers 59 forming a part of the friction pulley 41 are riding in the spiral groove 36 of the portion 35 of the shaft 31 and the groove is so designed that clockwise motion of driving shaft 10 will cause the fingers 59 to move the pulley 41 in a direction away from the bevel gear 30. As the pulley 41 is moved in the direction described, it will compress the spiral spring 37 against the stop collar 38 and, hence, resistance will be offered to the transverse movement of the pulley 41 by the wall of the spiral groove 36.

Also during this time the shaft 31, as hereinbefore described, is rotating clockwise and is, therefore, tending to rotate the pulley 41 clock-wise due to the pressure of the wall of its grooved slot 36 against the said fingers.

Hence, a portion of the power of the driving shaft 10 through a chain of means as hereinbefore described may be opposing the faster clock-wise rotation of the idler pulley 22.

It should be apparent that power will be transmitted from disc 49 to pulley 42 or from pulley 42 to disc 49 according to the resistance of the load on the driven member 11. This is true because the position of the pulley 41 is determined by balancing the torque of shaft 31 against the retarding effect of the resilient member 37, and the torque of shaft 31 is determined by the effort of gear 20 to turn gear 22 before the said gear 20 turns the driven member 11 by its reaction against the said gear 22.

Hence the actual position of pulley 41 is due to a resultant of several forces which combine to hold the retarding gear 22 whereby it may force the gear 20 to turn the shaft 11. Each new position of pulley 41 changes its speed relation with respect to disc 49 unless the pulley 41 should be moved to the right sufficient to centrally engage the surface of loosely mounted friction disc 48. In this case no power could be transmitted from disc 48 to pulley 41 as the said pulley would be held stationary. The gear 22 would also be held stationary due to its positive connection with the pulley 41 and hence the transmission as a unit would become a system with the fixed gear ratio of differential set gear 21, gear 20, and gear 22.

Therefore the power imparted to gear 22 by gear 20 may be considered as tending to drive the friction pulley 41 by means of shaft 31 and the fingers 59. But friction band 42 of pulley 41 is also being driven by disc 49 operatively connected to the driving member 10. If the speed ratio of disc 49 and friction band 42 is such that pulley 41 rotates faster than shaft 31 then the fingers 59 riding in the groove 36 will cause the pulley 41 to slide along the shaft 31 in either direction according to the direction of the spiral 36. If to the left then spring 37 will be compressed until the speed of pulley 41 equals 31 after which further movement to the left by pulley 41 will be effected only by transmitting power to shaft 31.

Shaft 31 may be caused to rotate in either direction by gear 22 but for the purpose of explanation I assume that it operates in the reverse direction to the normal direction of pulley 41 when driven by disc 49.

In this case the pulley 41 would be caused to oppose the rotation of shaft 31. This opposition would start with the initial compression of spring 37 (see Fig. 5) and would be proportional to the said compression causing a reaction of the fingers 59 against the walls of the spiral 36.

But the torque of shaft 31 would be governed by the load on shaft 11 as hereinbefore explained, and would cause the pulley 41 to move to the (say) left when increased. This would also cause pulley 41 to move relatively faster (or if so designed to move slower) and thereby retard the speed of gear 22 to a greater extent (or to a less extent).

The device therefore becomes a variable holding device which is able to act as a brake on gear 22 while all parts are in a state of rotation, and without the heat loss usually encountered in friction brakes.

All speed and torque changes of both the said driving and driven members will affect the position of pulley 41 and hence the variable retardation of gear 22 to effect the transmission of power as described on pages 1 and 2 when supplemented by manual or automatic variation of the status of the resilient member 37.

For the purpose of further explanation, we will consider that the speed of the driving shaft 10 and, consequently, the speed of the disc 49 is constant. Although it is readily understood that it could be variable. It is evident that as the friction band 42 is moved transversely relative to the disc 49 its speed will therefore vary relative to the speed of the disc 49 proportionally to its movement. It is also evident that the position of the pulley 41 will be determined by the resistance of the idler gear 22 and accordingly of the shaft 31 against retardation. In other words, the pressure of the fingers 59 against the wall of groove 36 due to the tension of the spring 37 will equal (neglecting frictional losses) the pressure of the said wall due to the resistance of the idler gear 22 against retardation. But the resistance of idler gear 22 is caused by the intermediate gear 20 revolving upon the said idler gear. Hence, the retardation of the idler gear 22 will be caused to vary its resistance to retardation because the speed retardation of friction disc 49 and friction wheel 41 will vary with the movement of the said wheel, and the said movement will depend on the resistance of the shaft 31 connected to the said idler gear.

For the purpose of further explanation, we will assume that the resistance of the driven shaft 11 is such as will be required to propel the vehicle by the internal combustion engine 8 under conditions of direct drive or normal minimum operating torque. Hence, the speed and torque ratio of the connected load will equal the speed and torque ratio of the driving shaft 10. (Note: The gears 20, 21 and 22 may be designed to give this condition when gear 22 is held stationary, or they may vary from a 1:1 ratio and the difference cared for by a mesh geared transmission inserted in the line of power between the gear 20 and the connected load, not shown.)

In my arrangement, this torque would create a minimum resistance in the resistant gear 22 and, hence, the pulley 41 will take the position on the grooved portion 35 of shaft 31 so as to bring the friction surfaces 42 of the pulley 41 to the center of stationary friction disc 48. Under these conditions the friction band 42 will be held stationary by stationary friction disc 48. With the bevel gear 25 held stationary because of its mechanical connection to the said pulley 41 power is transmitted from the gear 21 to the intermediate gears 20. These gears 20 will act against the teeth of the held idler gear 22 and thus cause the shafts 23 to rotate the driven shaft 11 (see Fig. 1). This causes the device to become in effect a direct drive.

As the resistance of the driven shaft 11 is increased due to its connected load, the torque, for any given condition of speed, will begin to increase in proportion, and accordingly the force necessary to hold the resistant gear 22 against the rotation of the gears 20 will proportionally increase. This increases the resistance of the bevel gear 25, bevel gear 30, shaft 31, portion 35 and the wall of the groove or slot 36, and the shaft will accordingly move the friction wheel 41 away from gear 30. This movement of friction wheel 41 carries the friction band 42 across the stationary surface of friction portion 48 and on to the rotating surface of friction disc 49. As friction disc 49 is rotating counter clock-wise the moving surface of friction disc 49 will allow the friction wheel 41 to move clock-wise and, hence, the shaft 31 will be allowed to rotate and thereby allow the previously stationary idler gear to be rotated in a direction opposite to the direction of rotation of driving gear 21, and the speed relations of the three gears 20, 21 and 22 will be changed with a resulting change in the speed relations of the driving shaft 10 and the driven shaft 11. As the load continues to increase the resistance of the idler gear will increase as hereinbefore described. Accordingly the friction wheel will be still further moved away from the gear 30. This will result in a further speed change between the friction disc 49 and the friction wheel 41, and a resulting faster rate of rotation of the shaft 31. Such action means less retardation of gear 25 or a greater increase in speed in a direction opposite to the direction of rotation of driving gear 21, and a still greater change in speed relation between the driving and driven shafts will occur. Hence, my device will automatically change speeds between its driving and driven members, said change being a function of the torque of the driving or driven member.

By connecting the control rod 55 to the fuel supply and thereby controlling the said supply through the movement of the said control rod and the circular follower 52, we can increase the speed of the driving member. As the rod is moved by the motion of the friction pulley 41, the said movement is, therefore, a function of the resistance of the connected load.

Hence, the fuel supply may be increased or decreased as the load is increased or decreased. In other words, the speed of the driving shaft 10 may be increased as the resistance of the load connected to the driven shaft 11 is increased. This means constant speed on the driven shaft 11 with varying load or torque.

Figure 4:
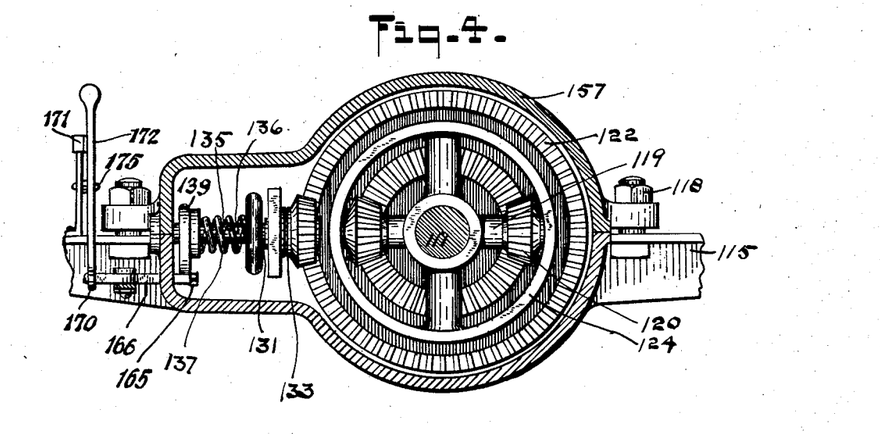

In Figure 4 there is shown a manually actuated selective control lever 172 fastened to a support 171 and designed to be rotated about the pivot 175 in order to impart desired motion to lever 166 and also control fingers 139 whereby the action of spring 135 may be varied to control the position of friction pulley 131 on shaft 135 for any given torque on the said shaft 135 as hereinbefore explained for Fig. 5.

By the means described, it is possible to secure all possible speed and torque ratios and combinations between the driving and driven members.

As, for example, if the direction of rotation of the driving shaft 10 is reversed, then an increase in resistance of the driven shaft 11 will result in an increase in speed of the said shaft. This is evident by following the action of the friction wheel 41. The control may be arranged to increase or decrease the supply of fuel or power to the source of power.

If the driven shaft 11 is made the driving member and rotated clock-wise, facing shaft from left end of Figure No. 1, then an increase of resistance in driven shaft 10 within certain limits will cause an increase of speed in the shaft, but if the said shaft 11 is rotated counter clock-wise then an increase of speed will cause an increase of torque. In addition, the source of supply could be automatically affected so that a constant torque could be secured with varying speed, or the automatically secured speed torque ratio could be manually changed by the hand control.

The embodiment of the invention as shown in Figure No. 3 resembles that of Figure No. 1 in that the driving shaft 110 has the driving gear 121 of the differential set keyed directly thereto. In this form, however, the last gear 122 is keyed direct to the driven shaft 111 and the transverse shaft or shafts 123 are mounted upon a hub 119, in turn loosely mounted on the driven shaft.

The intermediate gears 120 are loose upon the shafts 123, which shafts are projected beyond the outer face of the intermediate gears, the projecting portions of these shafts are designed to carry the circular frame 124 upon which is fixed the beveled gear 125. The description of the remainder of the device may be taken from the description of the embodiment as shown in Figure No. 1. The only difference between the embodiments shown in the two figures depends on whether the intermediate or last gears are keyed to the driven shaft.

In operation, it will be obvious that with this type of machine the driven shaft will rotate in a direction opposite to the direction of rotation of the driving shaft and, hence, by this means a reverse transmission is provided.

When applied to self-propelled vehicles, the reverse motion could be changed into forward at the differential connection or by other obvious methods.

All of the figures described are simply suggestive, and it is evident that with the given source of energy on the driven member, all the known methods in the mechanical art may be employed in producing arrangements whereby the variable resistance of the driven member is balanced against a variable static pressure and speed changes automatically effected thereby.

It is evident that there are many possible methods of control, such as manual, magnetic, pneumatic, etc., the main idea being to vary the source of power as desired or predetermined.

It is evident that any mechanical equivalent of the gears shown or the friction members may be employed to obtain the same results, and that any possible gear ratio of the gears described may be used to obtain relative speeds between the members.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, a differential set comprising a driving member, a resistant member mounted for rotary movement, an idler member operatively connected with both the driving member and the resistant member so as to be actuated by the difference in speed between these members, means connected to said idler for taking energy from same, resilient variable speed means including a pneumatic frictional surface acting on the resistant member for affecting the relative speed between these members, frictional power means operatively connected to the said driving member and to the said pneumatic surface for actuating the resilient means thereby to vary its effect on the resistant member, and electromagnetically actuated control means acting on the resilient means to co-operatively affect the resistant member thereby.

2. In a device of the class described, a differential set comprising a driving member and a resistant member mounted for rotary movement, an idler member operatively connected with both the driving member and the resistant so as to be actuated by the difference in speed between these members, an auxiliary driving member connected to the said driving member, an auxiliary driven member connected to the said resistant member, frictional driving surface rotated by the said auxiliary driving member, a second frictional surface designed for operative engagement with the first named frictional surface and operatively connected to the said resistant member, means for moving the second named surface relative to the first named surface thereby to variably affect the said resistant member, and electrical means acting on the means for moving the second named surface thereby to co-operatively affect the said resistant member.

3. In a device of the class described, a differential set comprising a driving member and a resistant member mounted for rotary movement, an idler member operatively connected with both the driving member and the resistant member so as to be actuated by the difference in speed between these members, an auxiliary driving member connected to the said driving member, an auxiliary driven member connected to the said resistant member, a frictional surface rotated by the said auxiliary driving member, a second frictional surface operatively connected to the said resistant member and arranged for sliding engagement with the first named surface thereby to retard the resistant member proportional to the torque of the means driven by the said idler member, and selective mechanical means designed to vary the effect of a resilient means arranged for varying the action of the said second named frictional surface.

4. In a device of the class described, the combination of means including a differential gear set formed of a driving gear, a loosely mounted gear, an idler gear meshing with both of said first named gears and mounted for revolving movement, a driven member operatively connected with said idler gear to be actuated by the revolving movement thereof and variable speed power means connected to both the driving member and the loosely mounted gear designed to dampen the tendency of said loosely mounted gear to be moved by the idler gear thereby to cause the driving gear to revolve the idler gear on the loosely mounted gear and thus rotate the driven member, means for varying the relative speeds of the power members of the said variable speed power means, and electromagnetically controlled means designed to variably affect the action of the said power means.

5. In a device of the class described the combination of means including a differential gear set formed of a driving gear, a loosely mounted gear, and idler gear meshing with both of said first named gears and mounted for revolving movement, a driven member operatively connected with the said idler gear to be actuated by the revolving movement thereof, a plurality of power transmitting means connected to the said driving member and to the loosely mounted gear and to each other to transmit power from one to the other and designed to dampen the tendency of the said loosely mounted gear to be moved by the said idler gear therewith to cause the driving gear to revolve the idler gear on the loosely mounted gear, and electromagnetically controlled means designed to vary the action of the said power transmitting means and also the supply of power to the said driving member.

6. A power transmission including a differential gear set formed of a driving gear, a loosely mounted gear, an idler gear meshing with both of first named gears and mounted for both revolvable and rotatable movement, a driven member operatively connected with said idler gear to be actuated by the revolving movement thereof and a mechanically actuated braking means consisting of two rotating members designed to transmit variable speed power from one to the other and to or from the driving gear and the loosely mounted gear, said mechanically actuated means designed to retard the movement of the loosely mounted gear thereby to cause the driving member to revolve the idler gear on the loosely mounted gear and thus rotate the driven member, automatically controlled means for effecting a desired speed ratio between the rotating members of the mechanically actuated braking means, and control means affecting the speed of the said driving gear and operatively associated with the said automatically controlled means.

7. A power transmission, including a differential gear set formed of a driving gear, a loosely mounted gear, an idler gear meshing with both of first named gears and mounted for revolving movement, a driven member operatively connected with said idler gear to be actuated by the revolving movement thereof and a mechanically actuated braking means consisting of two rotating members designed to transmit variable speed power from one to the other and to or from the loosely mounted gear, said mechanically actuated means designed to permit variation of the movement of the loosely mounted gear thereby to cause the driving member to revolve the idler gear on the loosely mounted gear and thus rotate the driven member, and automatically controlled means for effecting a desired speed ratio between the rotating members of the mechanically actuated braking means proportional to the resistance of the driven member, said ratio being a function of the resistance of the driven member, and manually controlled electromagnetic means for affecting the action of the said automatically controlled means.

8. In a device of the class described, the combination of a mesh gear differential set, a driving member operatively connected to one of the end gears to rotate the same, a driven member operatively connected to one of the other gears in the set to be rotated thereby, a speed control machine including a pair of co-acting friction elements mounted for relative rotary and transverse movement, one of said elements constituting means including a friction disc operatively connected to the said driving member and the other element constituting a co-acting transversely movable friction pinion operatively connected to one of the driven gears of the said differential set, mechanical means for moving the said rotatable friction pinion transversely of the said rotatable friction disc thereby to vary the relative speeds of the said elements, and electrical means designed to affect the action of the said mechanical means.

9. In a device of the class described, the combination of a mesh gear differential set, a driving member operatively connected to one of the end gears to rotate the same, a driven member operatively connected to one of the other gears in the set to be rotated thereby, a speed control machine including a pair of co-acting friction elements mounted for relative rotary and transverse movement, one of said elements constituting a means including a friction disc operatively connected to the said driving member and the other element constituting a co-acting transversely movable friction pinion provided with a pneumatic surface operatively connected to one of the driven gears of the said differential set, mechanical means for moving the said rotatable friction pinion transversely of the said rotatable friction disc thereby to vary the relative speeds of the said elements, and resilient means co-acting with the said mechanical means for positioning the said friction disc proportional to the torque of the driven member, means operatively associated with the said friction disc to vary the power of the said driving member, and manually controlled mechanical means designed to vary the action of the resilient means on the first named mechanical means.

10. In a device of the class described, the combination of means including a friction power member, a second friction power member co-actively associated with the first named power member, mechanical means for causing relative movement between the said power members thereby to vary the relative speeds of the said members, resilient means affecting the action of the said mechanical means to control the said relative movement, and electrical control means acting on the said resilient means.

11. In a device of the class described, the combination including means for rotating a friction power member, a second friction power member provided with a pneumatic surface co-actively associated with the first named power member, automatic mechanical means for causing relative movement between the said power members thereby to vary the relative speeds of the said members, resilient means affecting the action of the mechanical means to control the said relative movement, manually actuated mechanical control means to vary the effect of the said resilient means on the said mechanical means, control means actuated by the said mechanical means to vary the speed of one of the said power members thereby to impart constant torque to the other said power member, and manually controlled electrical means acting on the resilient means independent of the other said control means.

12. In a variable speed power transmission device, the combination with a constantly driving variable speed power member, of a driven member, mechanism operatively connecting the driven member with the driving member, mechanically controlled means for automatically affecting said mechanism proportional to the resistance of the driven member so as to vary the power of the driven member without affecting the torque of the driving member, and means for varying the power of the said driving member operatively associated with the said mechanically controlled means.

13. In a power transmission device, the combination with a driving member and a driven member, a connecting power transmission mechanism disposed between said members and mechanical means automatically actuated proportional to the resistance of the driven member and operatively associated with the power transmission system for automatically effecting a variation in the speed and torque ratios between said members, and control means actuated by the said mechanical means for varying the speed of the said driven member and the power imparted by the driving member.

14. In a power transmission machine, the combination with a driving member and a driven member, a connecting power transmission mechanism disposed between the said members mechanically actuated means operatively associated with the power transmission mechanism for automatically effecting a variation in the speed and torque ratios between said members proportional to the resistance of the driven member, and power control means actuated by the said mechanically actuated means to affect the power of the driving member.

15. A power transmission, including a differential gear set formed of a driving gear, a loosely mounted gear, an idler gear meshing with both of said first named gears and mounted for revolving movement relative thereto, a driven member operatively connected with said idler gear to be actuated by the revolving movement thereof, means designed to dampen the tendency of said loosely mounted gear to be moved by the idler gear proportional to the torque of the driven member thereby to cause the driving member to revolve the idler gear on the loosely mounted gear and thus rotate the driven member, manually controlled mechanical means for regulating the effect of said dampening means on said loosely mounted gear, and means actuated by the said dampening means to vary the power of the said driving gear.

16. A power transmission including a differential gear set formed of a driving gear, a loosely mounted gear, an idler gear meshing with both of said first named gears and mounted for revolving movement relative thereto, a driven member operatively connected with said idler gear to be actuated by the revolving movement thereof, means designed to dampen the tendency of said loosely mounted gear to be moved by the idler gear proportional to the torque of the driven member thereby to cause the driving member to revolve the idler gear on the loosely mounted gear and thus rotate the driven member, and manually controlled electromagnetic means for regulating the effect of said dampening means on said loosely mounted gear.

17. A power transmission, including a differential gear set formed of a driving gear, a loosely mounted gear, an idler gear meshing with both of said first named gears and mounted for revolving movement relative thereto, a driven member operatively connected with said idler gears to be actuated by the revolving movement thereof, resilient means designed to dampen the tendency of said loosely mounted gear to be moved by the idler gear proportional to the speed of the driven member thereby to cause the driving member to revolve the idler gear on the loosely mounted gear and thus rotate the driven member, and electromagnetically controlled means for regulating the effect of said dampening means on said loosely mounted gear.

18. A power transmission, including a differential gear set formed of a driving gear, a loosely mounted gear, an idler gear meshing with both of said first named gears and mounted for revolving movement relative thereto, a driven member operatively connected with said idler gear to be actuated by the revolving movement thereof, means designed to dampen the tendency of said loosely mounted gear to be moved by the idler gear proportional to the torque of the driven member thereby to cause the driving member to revolve the idler gear on the loosely mounted gear and thus rotate the driven member, and mechanically controlled selective means for regulating the effect of said dampening means on said loosely mounted gear, and the speed of the said driving gear.

19. A power transmission, including a differential gear set formed of a driving gear, a loosely mounted gear, an idler gear meshing with both of said first named gears and mounted for revolving movement relative thereto, a driven member operatively connected with said idler gear to be actuated by the revolving movement thereof, rotating frictional means designed to vary the tendency of said loosely mounted gear to be moved by the idler gear proportional to the torque of the driven member thereby to cause the driving member to revolve the idler gear on the loosely mounted gear and thus rotate the driven member, automatically controlled means for regulating the effect of said dampening means on said loosely mounted gear, and electrically controlled means for affecting the action of the said automatically controlled means.

20. In a device of the class described, an organization comprising a rotating power member, a second rotating power member operatively associated therewith, mechanical means for causing relative movement between said power members, a driven member operatively connected to said organization and to be co-actively actuated by the same, and means controlled by the resistance of the driven member and associated with said organization for effecting a change in speed of the driven member, and means controlled by the first named means to affect the speed of the first named rotating power member.

21. In a device of the class described, an organization comprising a rotating power member, a second rotating power member operatively associated associated herewith, mechanical means for causing relative movement between said power members, a driven member operatively connected to said organization and to be co-actively actuated by the same, and means controlled by the resistance of the driven member and associated with said organization for effecting a change in speed of the driven member, controlled electrical means for affecting the extent of the said change, and manually controlled selective mechanical means co-operatively associated with both the first and second named controlled means designed to affect the said change independently of the said electrical means.

22. In a device of the class described, the combination including a rotating friction member co-actively connected to a driving member, a second friction member resiliently connected to a driven member and co-actively associated with the first named friction member, mechanism operatively connecting the second named friction member and the driven member to automatically cause relative movement between the friction members thereby changing their relative speeds, means actuated by the movement of the second named friction member to vary the power of the driving member.

23. In a device of the class described, the combination with a member normally constituting a driving member, a member normally constituting a driven member and a driving connection between said members, a normally inactive source of power operatively connected to said driven member to drive the same when active and a driving connection between said members, of an automatically mechanically actuated speed control mechanism operatively connected to both the driving member and the driving connection and designed to retard the said driving connection to place the same in condition to permit said source of power to actuate the driven member at variable speed and to cause said normal driving member to become a driven member, manually operated selective mechanical control means to affect the said speed control mechanism, and electromagnetically actuated control means to affect the said speed control means when the said mechanical control means is not functioning.

24. In a device of the class described, the combination of a variable speed driving member, a resistant member, and a driven member, means for connecting the said three members in differential speed relation, means for resiliently holding the said resistant element, electrical means for varying the effect of the said resilient means, mechanical means also varying the effect of the said resilient means independently of the said electrical means, means actuated by the said resilient means thereby to effect the said variable speed of the said driving member.

25. In a device of the class described, the combination of a driving member, a resistant member, and a driven member, means for operatively connecting the said three members in differential speed relation, resilient means for affecting said speed relation, electromagnetically actuated means for affecting said resilient means, and loosely mounted means co-actively associated with the said resilient means for disconnecting the said driving member thereby to prevent transmission of power to the said driven member.

Signed at Brooklyn, in the county of Kings and State of New York, this 17th day of June, A. D. 1920.

HOWARD J. MURRAY.